United States Patent [19]

Esposito

[11] Patent Number: 5,130,174
[45] Date of Patent: Jul. 14, 1992

[54] SHAPED INTERLAYER BLANK

[75] Inventor: Robert A. Esposito, Amherst, Mass.

[73] Assignee: Monsanto Company, St. Louis, Mo.

[21] Appl. No.: 420,417

[22] Filed: Oct. 12, 1989

[51] Int. Cl.$^5$ .............................................. B32B 3/00
[52] U.S. Cl. .................................... 428/156; 428/157;
428/192; 428/194; 428/195; 428/207; 428/213;
428/215; 428/210; 428/220; 428/437
[58] Field of Search ............ 428/156, 437, 192, 194,
428/195, 203, 204, 207, 213, 215, 525, 210, 220,
222, 332, 906, 174, 157, 38; 296/84.1, 96.12,
96.18; 264/177.1

[56] References Cited

U.S. PATENT DOCUMENTS

| | | | |
|---|---|---|---|
| 2,937,407 | 3/1960 | Richardson | 18/48 |
| 3,019,475 | 2/1962 | Smith | 18/1 |
| 3,696,186 | 10/1972 | Stark et al. | 264/292 |
| 3,868,286 | 2/1975 | Fariss et al. | 156/163 |
| 3,885,899 | 5/1975 | Gurta et al. | 425/135 |
| 3,912,440 | 10/1975 | Koss et al. | 425/335 |
| 3,922,456 | 11/1975 | Baldridge | 428/203 |
| 4,302,263 | 11/1981 | Postupack | 156/100 |
| 4,316,868 | 2/1982 | Esposito et al. | 264/171 |
| 5,013,134 | 5/1991 | Smith | 350/174 |

Primary Examiner—Ellis P. Robinson
Assistant Examiner—Donald J. Loney
Attorney, Agent, or Firm—Michael J. Murphy; William J. Farrington

[57] ABSTRACT

A shaped interlayer blank adapted for use with glass in a vehicle windshield, such blank formed of plasticized polyvinyl butyral and having a quadrilateral peripheral contour with two sides of arcuate shape and a wedge-shaped thickness profile. The blank preferably has an arcuate gradient color band substantially parallel to an arcuate edge of the blank in the greater thickness region of the blank. The wedge-shaped thickness gradually increases from about 30 mils to about 35 to 40 mils across the width of the blank. The blank is tailored for safety windshields featureing head-up displays where to function effectively the glass layes must be nonparallel and canted with respect to each other.

5 Claims, 1 Drawing Sheet

SHAPED INTERLAYER BLANK

BACKGROUND OF THE INVENTION

This invention relates to discrete, shaped blanks of plasticized polyvinyl butyral (PVB) suitable for laminated safety glass windows and more particularly to a special design of such blank to accommodate a head-up feature associated with a windshield.

Thin sheet of plasticized PVB is well known as interlayer in laminated safety glass finding application in windows such as penetration-resistant automotive and aircraft windshields. The sheet used in modern windshields having severely curved and angled configurations has in the past been shaped by stretching straight-sided sections of unrolled sheet to the desired windshield configuration before glass lamination. When the interlayer has a color band along one margin intended to reduce glare from the sun when in place in the windshield, as is usually the case, stretching is such as to cause the initially straight color band to assume an arcuate configuration which matches the curved shape of the windshield. U.S. Pat. No. 4,808,357 discloses an improved apparatus and process for forming such a windshield blank by stretching initially uneven, extruding sheet the desired amount while the plastic is at elevated temperature and less likely to develop stresses causing shrinkback during later glass laminating. Blanks formed by such a system also have good thickness uniformity leading to improved impact resistance in service in the glass laminate.

Head-up display systems using holographic optical elements have recently been proposed for use in vehicle windshields. With these systems information is displayed to an occupant of the vehicle such as its driver while permitting such occupant to look straight ahead through the windshield. Head-up displays eliminate the need to glance downwardly to view operating information displayed on dials on the dashboard panel. However, at least with some head-up display systems using holograms, if the glass layers laminated on either side of the hologram assembly forming a conventional safety glass windshield are parallel to each other, as would be the case using blank of uniform thickness formed according to the '357 patent, the head-up display system will not function properly. In order for such head-up display system to function properly, the glass layers in the windshield laminate can not be parallel. It would be desirable to provide an interlayer windshield blank tailored to accommodate this developing requirement.

SUMMARY OF THE INVENTION

Now, improvements have been made to overcome prior art shortcomings with respect to interlayer blanks for use with laminated safety glass windows featuring head-up displays.

Accordingly, a principal object of this invention is to provide a cut blank for a laminated motor vehicle or aircraft safety window which facilitates incorporation of a head-up function into the window.

Another object is to provide such a shaped interlayer blank of uneven thickness which, when laminated in face-adhering contact with glass in a safety glazing assembly, results in a nonparallel, canted position of the glass layers with respect to each other.

A further object is to provide such a special blank which has the desirable dimensional stability and other features achieved with the system disclosed in U.S. Pat. No. 4,808,357.

Other objects of this invention will in part be obvious and will in part appear from the following description and claims.

These and other objects are accomplished by providing a shaped, interlayer blank adapted for use with glass in a vehicle windshield, preferably incorporating a head-up display therein, said blank being of plasticized polyvinyl butyral and having a quadrilateral peripheral contour with two sides of arcuate shape and a wedge-shaped thickness profile. The blank preferably has an arcuate gradient color band in the greater thickness region substantially parallel to an arcuate edge. The wedge-shaped thickness preferably increases from about 30 mils to about 35 to 40 mils across the width of the blank.

BRIEF DESCRIPTION OF THE DRAWINGS

In describing the overall invention, reference will be made to the accompanying drawings wherein.

DETAIL DESCRIPTION OF THE INVENTION

Figure 1:
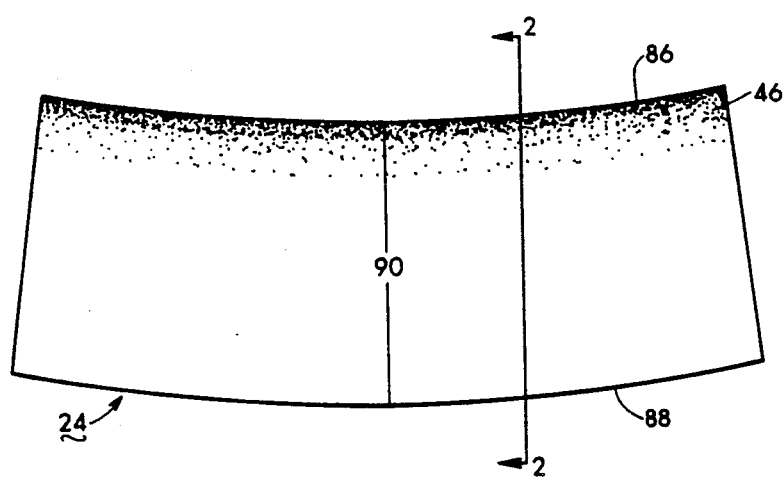
FIG. 1 is a plan view of a shaped interlayer blank according to the inventions.

Material essential to the disclosure of this application is disclosed in U.S. Pat. No. 4,808,357, particularly column 3, line 5 through column 8, line 1, the content of which is incorporated herein by reference.

More particularly, col. 3, line 5 through col. 8, line 1 of such patent discloses a method and apparatus for forming a shaped interlayer blank of plasticized polyvinyl butyral by initially extruding straight-sided sheet of purposely uneven thickness and then distorting the sheet by stretching the region of greater thickness somewhat more than that of lesser thickness which contains the color band so as to eliminate the uneven thickness and form an arcuate shape of even thickness having curvature to match that of the windshield in which it will be used. Shaping the sheet at elevated temperature while the plastic is still viscoelastic substantially eliminates development of undesirable stresses which can lead to shrink-back during subsequent lamination with glass under known conventional conditions of elevated temperature and pressure. Blanks are then cut from the continuous sheet in a down stream cutting station and accumulated in a stack for later lamination with glass or, to simplify the cutting operation, alternatively straight-sided blanks are cut out of the sheet and later trimmed to arcuate shape off-line.

This invention departs from the noted disclosure of the '357 patent insofar as preserving the initial uneven thickness of the sheet exiting die slot 16 in the finished, shaped blank product. More specifically, by appropriate manual adjustment of choke bar 47 in extrusion die 11, a preliminary wedge-shaped thickness profile is obtained in the sheet which is slightly incrementally greater in thickness dimensions than desired in the finished blank and this preliminary profile is reduced to the desired finished wedge-shaped thickness profile by drawing on the surface of frusto-conical pull roll 20b immersed in medium 26 beneath die 11. Also, such choke bar is adjusted so that the gradient band 46 is in the greater rather than the lesser thickness region of the sheet. Thereafter, blanks are successively severed from the sheet in the downstream station by the cutting means 22 shown in the '357 patent, or equivalent. The exact thickness dimensions of the uneven thickness sheet issuing from the die exit slot will depend on the radius of curvature of the finished windshield configuration.

Figure 2:
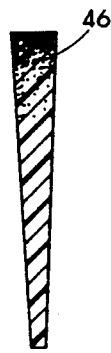
FIG. 2 is a sectional view along 2—2 of FIG. 1.

Thus, as depicted in FIG. 1, single layer shaped interlayer blank 24 is the product issuing from the system disclosed in the noted '357 patent when operated somewhat differently from therein disclosed according to the preceding description. Blank 24 of plasticized polyvinyl butyral is intended and adapted for use in a laminate with two layers of conventional glass in a windshield featuring a head-up display. In such windshield, the gradient color band will serve its usual prior art anti-glare function at the top of the windshield. Because of the wedge-shaped thickness of blank 24, such glass layers in the laminate will follow and be parallel to each planar side of the blank but will be non-parallel and canted with respect to each other as required for proper functioning of the head-up display system. Blank 24 has two lengthwise sides 86, 88 and arcuate gradient color band 46 extending substantially parallel to arcuate edge 86. As shown in FIG. 2, the greater thickness region of the wedge-shaped blank contains color band 46 with the balance of the plastic forming the blank being clear and uncolored. The important wedge-shaped thickness profile can vary depending on the contour and head-up display details of the windshield in which it will be used. It is generally about 30 mils (0.76 mm) thick along edge 88 and gradually smoothly increases to about 35 to 40 mils (0.89 to 1.02 mm), preferably to about 38 mils (0.97 mm) thick at edge 86. Such blank is generally about 24 to 55 in (61 to 140 cm) wide along dimension 90 in FIG. 1.

Since shaping occurs while the plastic of the blank is substantially at elevated extrusion temperature and is therefor substantially stress-free, on reheating during laminating such blanks should be shrink-stable and remain dimensionally accurate. Moreover, additives to enhance sheet performance incorporated into the plastic formulation charged to the extruder should not flash out of the sheet since post-forming during laminating can be avoided.

Though the special bank of the invention is designed for use in windshields featuring head-up displays, it may alternatively be used in any safety glazing application where non-uniform interlayer thickness is desired.

The preceding description is set forth for purposely of illustration only and is not to be taken in a limited sense. Various modifications and alterations will be readily suggested to persons skilled in the art. It is intended therefor that the forgoing be considered as exemplary only and that the scope of the invention be ascertained from the scope of the following claims.

What is claimed is:

1. A shaped interlayer blank for use with glass in a vehicle windshield, said blank being a single layer formed of plasticized polyvinyl butyral and having a quadrilateral peripheral contour with two sides of arcuate shape and a wedge-shaped thickness profile extending from the edge of one arcuate side to the edge of the other arcuate side.

2. The blank of claim 1 having an arcuate gradient color band substantially parallel to an arcuate edge of the blank.

3. The blank of claim 2 wherein the greater thickness region of the blank includes the gradient color band.

4. The blank of claim 1, 2, or 3 wherein the wedge-shaped thickness increases from about 30 mils to about 35 to 40 mils across the width of the blank.

5. The blank of claim 4 wherein the greatest thickness is about 38 mils.

* * * * *